March 23, 1937.    F. VON VOIGTLANDER    2,074,875
SYNTHETIC TONE SIGNAL
Filed June 2, 1933    2 Sheets-Sheet 1
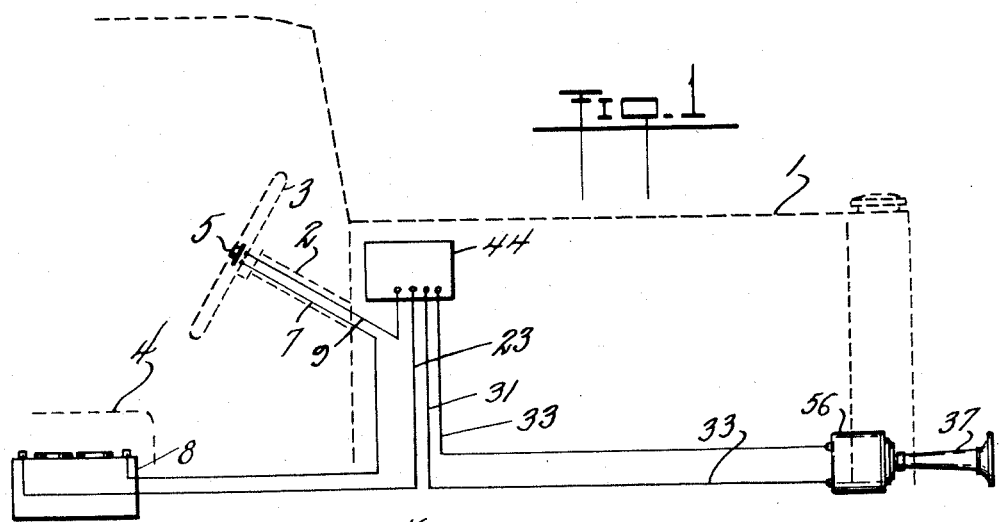
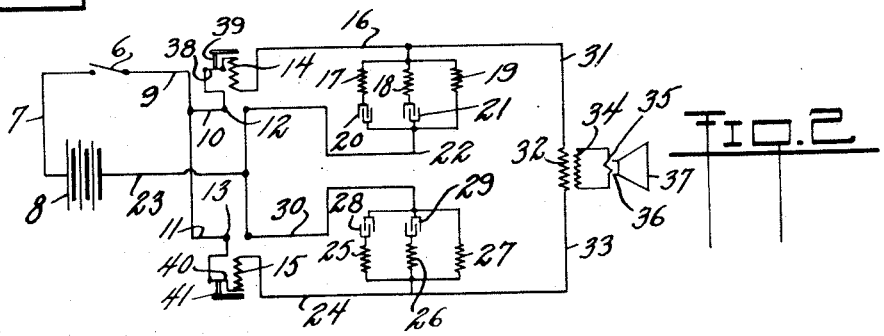
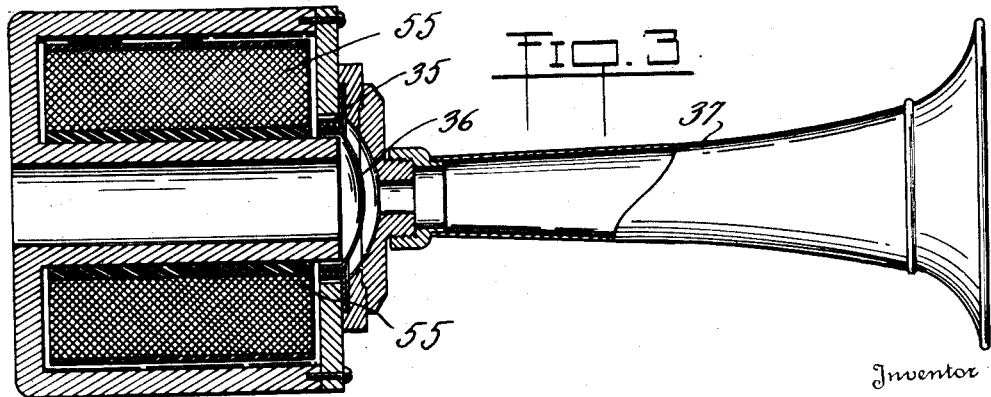
Inventor
Frederick Von Voigtlander
By Geo. E. Kirk
Attorney

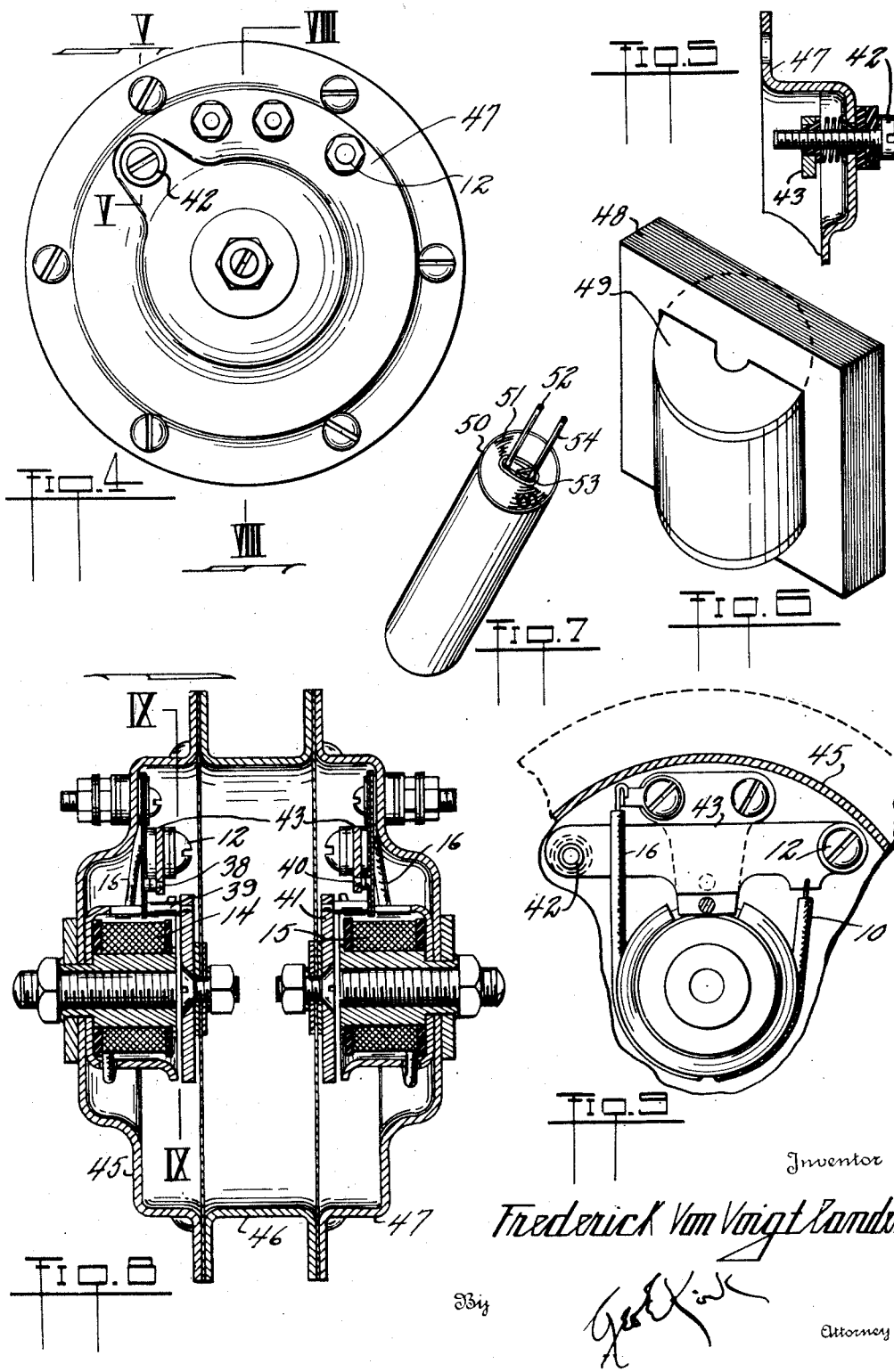

Patented Mar. 23, 1937

2,074,875

UNITED STATES PATENT OFFICE 2,074,875

SYNTHETIC TONE SIGNAL

Frederick Von Voigtlander, Adrian, Mich., assignor to Schwarze Electric Company, Adrian, Mich., a corporation of Michigan Application June 2, 1933, Serial No. 674,070

2 Claims. (Cl. 177—7)

This invention relates to the control of sound production more especially for signalling.

This invention has utility when incorporated in predetermining sound or sounds and the projection thereof.

Referring to the drawings:

Fig. 1 is a view of an embodiment of the invention as incorporated in an automobile;

Fig. 2 is a wiring diagram of the device of Fig. 1;

Fig. 3 is an enlarged view of features of the projector of Fig. 1;

Fig. 4 is a view of a buzzer device embodied for electric current conversion;

Fig. 5 is a view on the line V—V, Fig. 4;

Fig. 6 is a perspective view of an inductance type of impedance hereunder;

Fig. 7 is a perspective view of a condenser type of impedance hereunder;

Fig. 8 is a section on the line VIII—VIII, Fig. 4; and

Fig. 9 is a view on the line IX—IX, Fig. 8.

Motor vehicle 1 is shown provided with steering column 2 and steering wheel 3 at station 4 for the operator or driver thereof. Conveniently to this station there may be audible signal control by push button 5 at steering wheel 3. This push button 5 effects closing of switch 6 connected by line 7 to battery 8 carried by the vehicle 1.

From this switch 6, line 9 extends to branches 10, 11, (Fig. 2) having terminals 12, 13, respectively, in connection to coils 14, 15. From the coil 14, line 16 extends to inductance coils 17, 18, 19. In series with inductance coils 17, 18, are condensers 20, 21. From these condensers 20, 21, and the inductance 19 extends line 22 as a branch of line 23 to the battery 8. From the coil 15 extends line 24 to inductance coils 25, 26, 27. In series with the coils 25, 26, are condensers 28, 29. From these condensers 28, 29, and the inductance coil 27, extends line 30 as a branch of the line 23 in completing the circuit to the battery 8. From the line 16 extends line 31 to transformer winding 32 and thence by line 33 to the line 24, thus connecting across from the line 16 to the line 24 this transformer winding 32. The impedance network is thus in shunt with the transformer. This transformer winding 32 as a primary, cooperates with secondary winding 34 having in circuit therewith armature winding or coil 35 on diaphragm 36 of projector 37 of a horn. At the coil 14 is switch 38 operated by interrupter 39. At the coil 15 is switch 40 operated by interrupter 41. The buzzer and battery constitute a generator of electrical vibrations. The interrupter is effective for bringing about voltage changes at such a rate as to be in the audible frequency range.

In a motor vehicle the electric energy source may conveniently be the storage battery 8. Under the invention herein, there is purpose in determining frequency for an electric current condition. In carrying out this feature, the system including the buzzer coils 14, 15, may be designed respectively to have a frequency of say 800 for the switch 38 and 1000 for the switch 40. This nicety of adjustment may to an extent be controlled by adjusting screw 42 (Fig. 5) in adjusting plate 43 in locating the contacts for the switch 38 as well as for the switch 40.

These current interruptions are hereunder influenced by impedances to cooperate for minimizing frequency conditions departing from that desired to be produced at the frequency rate for the interrupter 39. In fact there is effected hereunder a filtering out of the undesired frequency while allowing the desired frequency to go through the horn. This filter device includes impedance of the network between the lines 16, 22, which may be high for 800 cycles per second and low for 1600 cycles, and low for 1000 cycles. There is thus a tendency to suppress the undesired frequencies, but with the desired frequency of 800 to be out of proportion larger in its relative volume as generated. The interrupter 41, say operating at 1000 frequency, may have the reactance devices between the lines 24, 30, high for 1000 cycles, low for 2000 cycles, and low for 800 cycles. There is thus made provision that the energizing source may have its current modified for the selected or fundamental frequencies, and that such have their influence from the interrupted direct current source to be modified and effective from the transformer as alternating current frequencies superimposed for synthesizing in a tone combining those generated. The instance or example selected is by direct generation instead of the fourth and fifth harmonics of 200. Due to the relatively magnified proportion of the predetermined frequencies, this composite tone has a purity for carrying distance as an audible signal with avoidance of those features of harshness which may be objectionable under many circumstances of traffic.

Accordingly, the output of the secondary winding 34 is a combination of currents of these two frequencies in an audible range for acting upon the diaphragm 36 through its armature winding 35 as influenced by the electro-magnet.

This combination of frequencies, as electrically controlled and mechanically generated into the audible range for synthesizing has the projector 37 of a proportion tending to suppress, at least not amplify, the tones away from that of the synthesized tone projected while favoring or retaining the frequencies in those proportions out of relative relation to amplify the synthesized tone by its resonant properties. In view of the many factors involved, experimentation has proven as satisfactory as computations in obtaining the end, not only as to sound generator, but as to the projector.

It is thus seen that hereunder, there is a source of electric current supply, which source is modified to vary its frequency; that while currents of various frequencies may be produced by synchronous alternator, synchronous commutator, inductor alternator, induction generator, rotary converter or frequency changer, or even by thermionic generator of vacuum tube, gaseous tube, metallic vapor tube types; or even an arc, cold cathode generator, or a microphone, phonographic record or photo-electric apparatus; such may not be as readily installed or as effective in practice for simplified and economic design as the buzzer type of electro-magnetic diaphragms having interrupters as hereunder described. These interrupters may be compact, may not disturb the general system or economic production for definite frequency. They may be readily installed as for instance, housing 44 may be placed under the hood and have therein shell members 45, 46, 47, of the buzzer pair, therein lamina 48 with spool 49 for the respective inductance coils. Similar general physical form may be adopted for the transformer 32, 34. Additionally, wraps of paper 50 alternate with wraps of foil 51 to terminal 52 and other wraps of foil 53 to terminal 54 of the respective condensers. Winding 55 may energize the magnetic circuit for the dynamic projector to be acted upon by the winding 35.

The buzzer is shown as a simple type instead of double acting. The control for the frequency may be determined by the design as well as secondary or tap features in obtaining the relationship for the frequencies which it is desired to propagate for synthesizing in the projected tone. This projected tone may be modified, or there may be building up of the number of elements entering the tone, say by additional buzzers or other frequency production source and the tone controlled by eliminating one or more of these sources of frequency.

The control for the transmitted or circuit effected frequency at the buzzer may be of an additional control by variation from the simple type of transformer to be influenced therefrom, even to separate transformers 32, 34 for the different frequency sources with the reactance features variously placed and the connections variously grouped and the transformer even with the reduced number of connection types of interconnections, as winding 32 of two coils and therebetween a connection to the branch 30. Housing 56 at the projector may be located away from under the hood of the automobile apart from the assembly of the housing 44. When both are under the hood, they may be as a unit with the portion 44 extended to house the parts with the projector 37 therefrom. In consolidation of the assembly the transformer may even have the buzzer coil as its primary and the secondary then be wound with, on or at a coil 14 or 15.

What is claimed and it is desired to secure by Letters Patent is:

1. In an electromagnetic sounding device having a sound producing diaphragm responsive to pulsating current in a coil, a coil, two electromagnetic interrupters tuned to different frequencies, a circuit connecting the coil and interrupters in series, two filter devices connected in series across the coil and between the coil and interrupters, a current source, a connection between one side of the current source and the connection between the filter devices, a connection between the other side of the current source and the connection between the interrupters, the filter device adjacent each interrupter having means for preventing undesirable frequencies from said adjacent interrupter from entering the coil circuit and having means for passing the desirable frequencies from the other interrupter to the coil circuit.

2. An electromagnetic sounding system comprising a diaphragm horn circuit, a pair of electromagnetic interrupters having different predetermined fundamental frequencies, a filter for each of the above interrupters, each filter having a relatively high impedance to currents of the fundamental frequency of its associated interrupter and connected across said interrupter, an additional circuit across each interrupter including in series said horn circuit and the filter connected across the other interrupter, a current source and means to connect said source to the electromagnetic interrupters in parallel.

FREDERICK VON VOIGTLANDER.